United States Patent [19]

Glahn

[11] 4,286,621
[45] Sep. 1, 1981

[54] DUAL ACTING CHECK VALVE DAMPENER

[75] Inventor: Robert J. Glahn, Tulsa, Okla.

[73] Assignee: Geosource Inc., Houston, Tex.

[21] Appl. No.: 103,902

[22] Filed: Dec. 17, 1979

[51] Int. Cl.³ .................. F16K 1/20; F16K 21/10
[52] U.S. Cl. ................................ 137/514; 91/437;
  92/122; 188/306; 188/308; 188/310
[58] Field of Search ............. 91/437; 92/122;
  188/306, 308, 310; 137/514; 251/48, 51, 55, 58,
  228, 298, 47; 417/481

[56] References Cited

U.S. PATENT DOCUMENTS

| Re. 19,631 | 7/1935 | Peo | 188/310 |
|---|---|---|---|
| 1,802,350 | 4/1931 | McIntyre | 188/310 |
| 2,760,512 | 8/1956 | Nechine | 137/514 |
| 2,806,451 | 9/1957 | Vinkler et al. | 92/122 |
| 3,047,012 | 7/1962 | Smith | 137/514 |
| 3,106,200 | 10/1963 | Hose | 137/514 |
| 3,155,019 | 11/1964 | Stiglic et al. | 92/122 |
| 3,177,894 | 4/1965 | Camp | 137/514 |
| 3,191,613 | 6/1965 | Bagwell | 137/514 |
| 3,327,592 | 6/1967 | Wilkinson | 92/122 |
| 3,422,843 | 1/1969 | Blackman | 137/514 |
| 3,592,104 | 7/1971 | Harness | 92/122 |
| 3,698,521 | 10/1972 | Taylor | 188/306 |
| 3,789,872 | 2/1974 | Elliott | 137/514 |
| 3,942,551 | 3/1976 | Schuller et al. | 137/514 |

FOREIGN PATENT DOCUMENTS 920769 10/1954 Fed. Rep. of Germany ............ 92/122

*Primary Examiner*—Martin P. Schwadron
*Assistant Examiner*—G. L. Walton
*Attorney, Agent, or Firm*—Arnold, White & Durkee

[57] ABSTRACT

A dampener for a clapper valve wherein a rotor member having radially outwardly extending vanes which subdivide each of two fluid cavities defined in a housing into first and second fluid volumes is characterized by radially extending, first and second passages axially spaced within the rotor which respectively communicate each of the first volumes and the corresponding second volume. The increase in pressure within either of the volumes generated by the motion of the vanes (which move with the clapper) is accommodated by the fluid in one passage venting to the other passage through an axially movable valve. The valve piston presents equal surface areas to each passage, to thereby fluid balance the damper in both the opening and closing directions of the clapper. A bypass channel is provided through which one of the fluid volumes in the first cavity with one of the volumes in the second cavity.

12 Claims, 4 Drawing Figures

DUAL ACTING CHECK VALVE DAMPENER

BACKGROUND OF THE INVENTION

1. Field of the Invention

This invention relates to a damper arrangement for a check valve and, in particular, to a damper arrangement adapted to retard both opening and closing movements of a check valve.

2. Description of the Prior Art

Most check valves that are used in the petroleum production industry and which exhibit medium through large diameter sizes (on the order of twelve inches to fifty-two inches, respectively) are constructed in hinged clapper form. Clapper check valves of this type generally include a clapper, or valve member, which is keyed or otherwise securely mounted to a valve shaft. The valve shaft is mounted for rotary movement within an enlarged portion of the valve casing, the axis of rotation of the valve shaft being disposed transversely to the fluid flow path defined through the valve casing from an inlet port to an outlet port. The clapper and its shaft are thus free to pivot in an opening direction to permit fluid flow from the valve inlet port to the outlet port. However, if the fluid should begin to flow in an opposite direction (from the outlet port to the inlet port) the clapper is urged toward the seated position to prevent such backflow.

It is often desirable to retard or otherwise control the opening and closing movement of the valve clapper in order to prevent the application of large reaction forces to the valve casing and related components of a fluid system. U.S. Pat. No. 3,942,551 (Schuller, et al.) relates to a hydraulic damping mechanism for check valves used to prevent slamming of the clapper against a valve seat. U.S. Pat. No. 3,177,894 (Camp) and U.S. Pat. No. 3,789,872 (Elliott) likewise relate to mechanisms for damping the motion of check valve clappers. Each of these three above-cited patents (the first two of which are assigned to the assignee of the present invention) appear to disclose damping arrangements which are connected to the valve clapper through connecting rods which are hinged or otherwise pivotally mounted to the back surface of the clapper. U.S. Pat. No. 2,760,512 (Nechine) and U.S. Pat. No. 3,191,613 (Bagwell) each also appears to relate to a damping arrangement for a check valve.

U.S. Pat. No. 3,047,012 (Smith) and U.S. Pat. No. 3,106,220 (Hose) both appear to disclose a valve damper which includes a fluid casing within which a vaned rotary member is mounted for movement. The compression of damping fluid within the casing by the vane generates a damping force to retard the movement of the valve clapper.

U.S. Pat. No. 3,442,843 (Blackman, et al.) concerns a vaned damping arrangement which is provided with a pressure relief mechanism. The pressure relief mechanism takes the form of ball check valve disposed in each of the vanes of the rotary member and appears to permit the flow of damping fluid in only one direction through the vanes.

SUMMARY OF THE INVENTION

This invention relates to a damping arrangement for a check valve which is adapted to damp the opening and closing movements of the clapper. The damper arrangement includes a fluid-tight housing having a cavity therein which is adapted to receive a high viscosity damping fluid. The housing is connectable to the valve casing such that the axis of the housing lies substantially coincident with the rotational axis of the valve shaft. A rotor member is movably disposed within the fluid-tight housing, the rotor being connectable to the valve shaft for movement therewith. The rotor has at least one radially outwardly extending vane thereon, the vane protruding into the cavity in the housing so as to subdivide that cavity into a first and a second fluid volume. The vane is displaceable within the cavity in a first or a second direction depending upon the opening or closing movement of the clapper. The movement of the vane through the damping fluid disposed within the cavity retards the movement of the clapper by increasing the pressure of the damping fluid disposed in the fluid volume forward of the vane in the direction of motion thereof. The damper is characterized by a pressure relief arrangement disposed within the rotor and communicable with both fluid volumes to relieve pressure generated in the fluid in the volume forward of the vane in the direction of movement thereof. When the fluid pressure in that fluid volume exceeds a predetermined pressure, the pressure in that volume is relieved by venting that volume to the other of the fluid volumes.

In a more detailed embodiment of the invention the pressure relief arrangement includes a first and a second passage provided in the rotor, each passage being in fluid communication with the first and second fluid volume, respectively. A valve is disposed between the first and second passages, the valve being biased by a predetermined biasing force, such as that imposed by a Belleville spring, to maintain the valve in a normally closed position thus isolating the first and the second passages from each other. The valve responds to a force which is imposed thereon when the pressure of the fluid in either of the fluid volumes exceeds the predetermined pressure and therefore overcomes the biasing force to open the valve and to communicate the first passage with the second passage.

In a yet more detailed embodiment of the invention the valve element is mounted so as to be coaxial with the axis of the fluid housing. An equal portion of the surface of the valve member is exposed to the pressure of the fluid in the first and second passages and responds to a pressure build-up in either passage (and, therefore, in either volume) to displace the valve axially with respect to the center line of the housing to thereby communicate the first with the second passage.

In yet another detailed embodiment of the invention the rotor member is provided with two vanes, each vane radially extending from diametrically opposed portions of the surface of the rotor. The extreme radially outward surface of the rotors lies within a predetermined close tolerance of the interior of the fluid-light housing. Each of the rotors subdivides a first and a second cavity (defined within the fluid-tight housing by a stationary, radially-inwardly depending stator member) into first and second fluid volumes. The passages take the form of radially extending through bores provided in axially spaced relationship within the rotor. An axially extending communication bore is provided in the rotor to link the first and second passages. The valve member is axially biased against a seat provided about the periphery of the through bore so that equal portions of the valve member are exposed to the fluid pressures in the first and the second passage.

It is also in accordance with the invention to provide a bypass flow channel in one of the stators. The flow channel communicates one of the fluid volumes in the first pair of fluid volumes with the opposite one of the fluid volumes in the second pair. The flow area of the bypass channel is regulated by a moveable bypass piston.

BRIEF DESCRIPTION OF THE DRAWINGS

The invention will be more fully understood from the following detailed description thereof taken in connection with the accompanying drawings, which form a part of this application and in which:

FIG. 4 is an enlarged view of a portion of the valve dampener arrangement shown in FIG. 2 particularly illustrating the valve biasing arrangement.

DETAILED DESCRIPTION OF THE INVENTION

Figure 1:
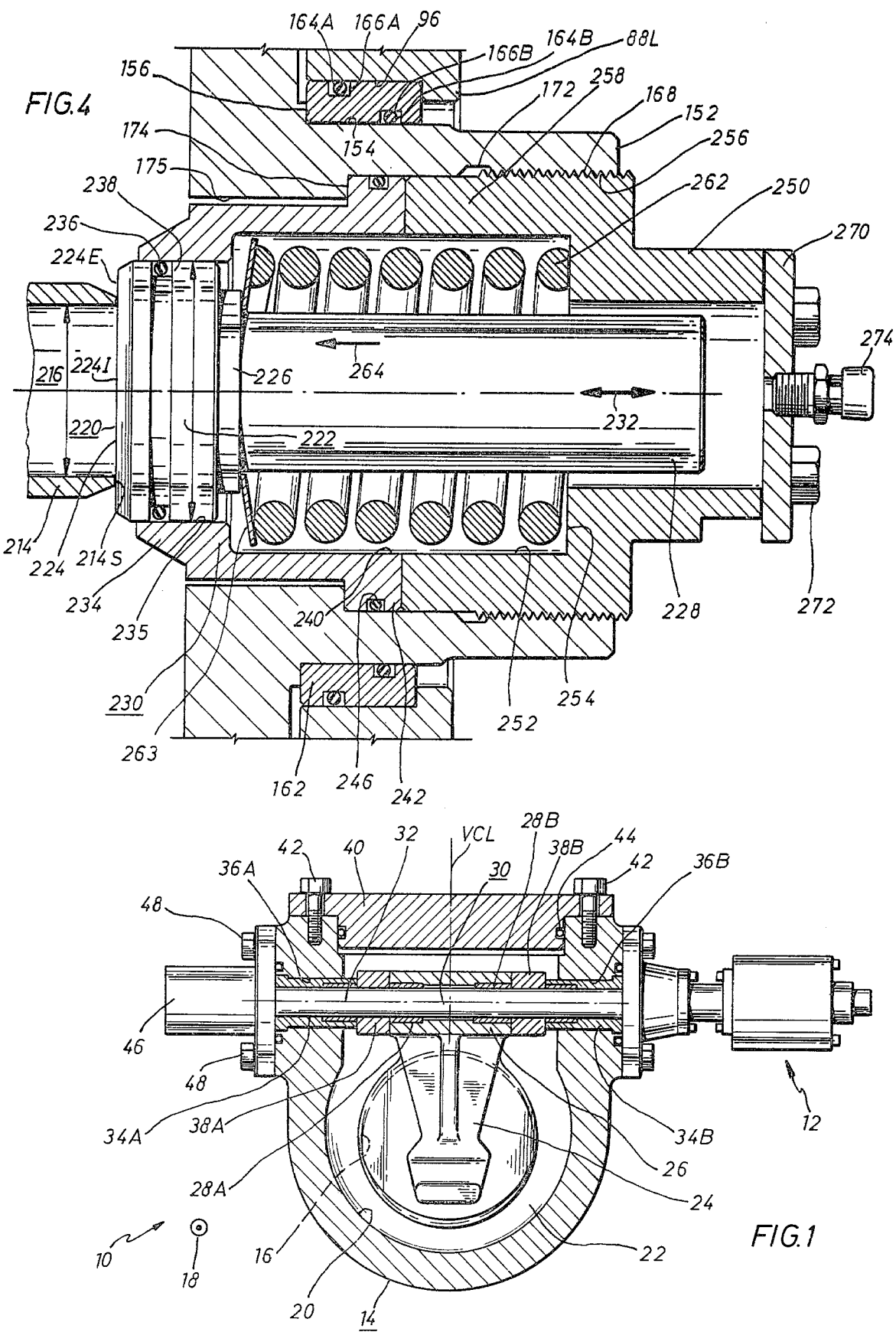
FIG. 1 is a sectional view through the valve housing of a clapper check valve of the type with which the dampener arrangement of the instant invention is associated.

Throughout the following description similar reference numerals refer to similar elements in all figures of the drawings.

With reference to FIG. 1 shown is an elevational view of a swing-type clapper check valve 10 with which a dampener arrangement generally indicated by reference character 12 in accordance with this invention finds utility. In most instances the dampener 12 is used with large swing-type check valves which have a clapper ranging in size from twelve to fifty-two inches in diameter. However, it is to be understood that a dampener arrangement 12 embodying the principles of this invention, if appropriately sized, may be utilized to dampen the motion of the shaft of any swing-type check valve or any rotatable shaft.

As seen in FIG. 1, the valve 10 includes a casing 14 having an inlet port 16 and an outlet port (not shown) defined therein. A fluid flow path defined in the direction of flow arrow 18 extends from the inlet port 16, through an enlarged portion 20 of the casing 14, to the outlet port.

A valve clapper 22 is mounted for rotary movement within the enlarged portion 20 of the casing 14. The clapper 22 includes an arm 24 which is mounted to the rear face of the clapper. The upper end of the arm 24 is merged into a sleeve 26 which is secured, as by keys 28A and 28B, to a valve shaft 30. The valve shaft 30 is rotatable about its axis 32 on bearings 34A and 34B. The bearings 34 are respectively received within apertures 36A and 36B disposed in the casing 14 on opposite sides of the vertical centerline VCL thereof. Suitable spacers 38A and 38B are provided. The enlarged portion 20 of the casing 14 is enclosed by a cover 40 which is secured to the casing 14 by studs and nuts 42. Leakage from the interior of the casing 14 is precluded by a seal 44. The end of the shaft 30 which protrudes through the aperture 36A is received within a member 46, itself bolted to the side of the casing 14 by studs and nuts 48.

It is for the purpose of retarding the rotary movement of the clapper in both the opening and closing directions that the dampener arrangement 12 in accordance with this invention is utilized.

The end of the shaft 30 which protrudes through the aperture 36B extends into the dampener arrangement 12. The details of the structure of the dampener arrangement 12 is best seen in connection with FIGS. 2, 3 and 4, to which reference is now invited.

Mounted externally to the valve casing 14 about the aperture 36B therein is an adapter 54. The adapter 54 has opposed mounting flanges 56L and 56R provided thereon. The mounting flange 56L receives a plurality of mounting studs and nuts 58 which secures the adapter 54 in the illustrated position about the casing aperture 36B. The adapter 54 includes a cutaway portion disposed radially inwardly of the mounting flange 56L. The cutaway portion forms a radially extending shoulder 60, defined with respect to the axis 32 of the shaft 30.

The shaft 30 is sealed in the vicinity of the casing aperture 36B by a suitable seal arrangement 62. The seal arrangement 62 includes an annular seal mounting member 64 which is axially supported between the end of the bearing 34B and the shoulder 60 provided in the adapter 54. The seal mounting member 64 includes first and second circumferentially disposed grooves 66L and 66R provided along the exterior surface thereof. Each of the grooves 66L and 66R receives a suitable sealing element, as an O-ring seal 68L and 68R, respectively, in order to insure sealed integrity and prevent leakage from the interior of the housing 14 through the interface between the casing 14 and the seal mounting member 64 in the vicinity of the aperture 36B. A central groove 66C is disposed circumferentially about the interior surface of the seal mounting member 64 axially intermediate the grooves 66L and 66R. A sealing element, such as an O-ring seal 68C, is disposed in the central groove 66C. The seal 68C operates to prevent leakage from the interior of the casing 14 along the interface between the shaft 30 and the seal mounting member 64. A vent opening 70, plugged by a threaded pin 72, is provided in the vicinity of the axial abutment of the seal mounting member 64 and the end of the bearing 34B.

The shaft 30 extends through the adapter 54. The end 30B of the shaft 30 projecting beyond the flange 56R is of a reduced radial dimension that is less than the radial dimension of the remainder of the shaft 30. The end 30B of the shaft 30 takes a substantially rectangular configuration when viewed in a cross-section taken transversely to the shaft axis 32.

The rectangular end 30B of the shaft 30 projects into a dampener housing 80. The dampener housing 80 is secured to the end of the adapter 54 by an array of studs and bolts 82. The housing 80 is a substantially cylindrical member having a radially inwardly directed flange 84F (defined with respect to the center axis 32 of the shaft 30) which receives the bolts 82 securing the housing to the adapter 54. The flange 84F has a central opening 86 therein which is partially radially overhung by a lip 84L. The opposite end of the housing 80 is closed by a cover 88 secured to the end of the housing by an array of bolts 90. Sealed integrity of the interface between the cover 88 and the housing 80 is insured by a seal 92 disposed in an annular groove 94 provided in a radially enlarged lip 80L of the cover 80. The cover 88 is also provided with a central axial opening 96 and a threaded opening 98, disposed eccentrically of the cover 88, both for purposes to be made clearer herein. The opening 96 is partially overhung by a radial lip 88L.

Figure 3:
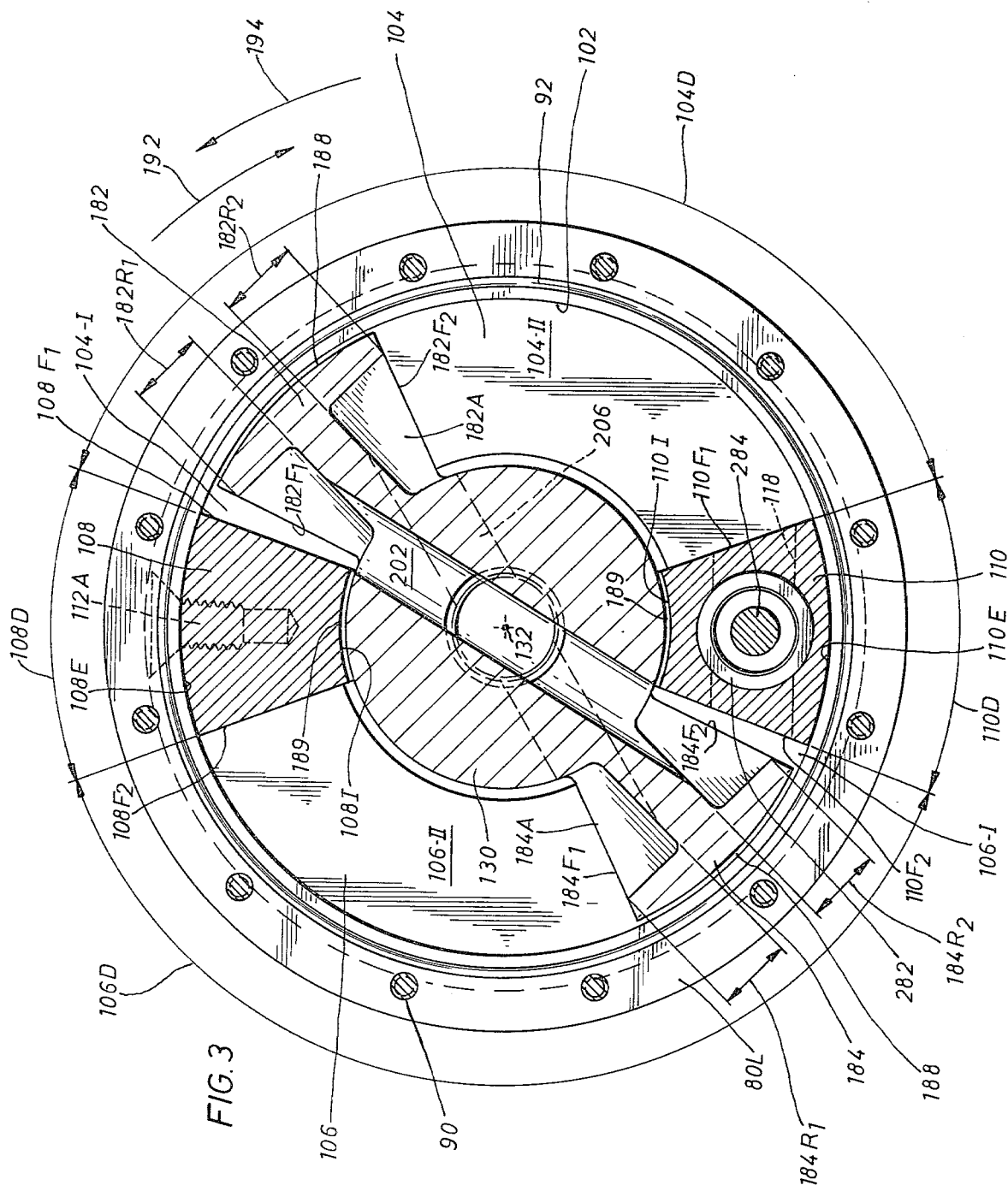
FIG. 3 is a sectional view taken along section lines 3—3 of FIG. 2.

The interior surface 102 of the housing 80 defines a substantially fluid-tight region therewithin. As seen in FIG. 3, the region within the housing 80 is subdivided into a first and a second fluid-tight cavity 104 and 106, respectively, by radially inwardly depending stators 108 and 110. The stators 108 and 110 are each substantially wedge-shaped members when viewed from their ends, and are secured to the housing 80 by radially extending bolts 112A and 112B, respectively. The stators 108 and 110 are preferably diametrically opposed from each other.

The radially exterior outer surface 108E and 110E of each of the stators conform in shape to the portion of the interior surface 102 against which they are secured. The radially inner surfaces 108I and 110I of each of the stators are substantially cylindrical in shape, as shown in FIG. 3. The cavity 104 is defined between the radially extending faces 108F$_1$ of the stator 108 and the radially extending surface 110F$_1$ of the stator 110. The cavity 106 is defined between the radially extending surfaces 108F$_2$ and 110F$_2$, respectively disposed on the stators 108 and 110. The angular dimension of each cavity, illustrated in FIG. 3 by dimension lines 104D (between the surfaces 108F$_1$ and 110F$_1$) and 106D (between the surfaces 108F$_2$ and 110F$_2$), is dependent upon the angular dimension 108D and 110D of each of the stators. Access to each of the cavities 104 and 106 may be gained through access parts 114A and 114B (FIG. 2), through which a damping fluid, as hydraulic oil, may be introduced.

One of the stators, as the stator 110, has a transversely extending channel 118 (defined with respect to the axis of the shaft 30) disposed therein. The purpose served by the channel 118 is set forth in full detail herein.

Again referring to FIG. 2, the rectangular end 30B of the shaft 30 is received within a correspondingly shaped orifice 124 disposed within a rotor member 130. The mated engagement of the shaft portion 30B with the rotor 130 keys the shaft 30 to the rotor 130 and disposes the axis 32 of the shaft in substantial co-linearity with the central axis 132 of the rotor. The rotor 130 is thus rotationally movable with the shaft 30.

An annular lip 134 extends axially from the main body portion of the rotor 130 and defines an axially extending surface 136 thereon. The surface 136 is terminated by a shoulder 138. To effect the sealed integrity of the interior of the housing 80, an annular seal mounting member 140 is confined between the confronting axially extending surfaces which define the opening 86 in the housing 80 and the surface 136 on the rotor 130. The member 140 is further restrained by the radially extending surfaces of the lip 84L and the shoulder 138. The interface between the member 140 and the housing 80 is sealed by an O-ring seal 142A disposed in a groove 144A provided in the radially outer surface of the member 140. A second seal 142B, spaced axially from the seal 142A, is disposed in a groove 144B provided on the radially inner surface of the member 140, thus effectively sealing the interface between the member 140 and the axially extending surface 136 of the rotor 130.

At the opposite end of the rotor 130 an elongated annular neck 152 extends axially from the main body portion of the rotor. The exterior surface of the neck 152 defines an axially extending surface 154 thereon. The surface 154 is terminated by a radially extending shoulder 156. To effect to sealed integrity of the interior of the housing 80, an annular seal mounting member 162 is disposed between the axially extending surface 154 on the rotor 130 and the portion of the cover defining the opening 96 therein. The member 162 is axially constrained between the shoulder 156 and the lip 88L on the cover 88. A seal 164A disposed in a groove 166A in the member 162 seals the interface between the member 162 and the cover 88. A second seal 164B, disposed in a groove 166B axially spaced from the first groove 166A, seals the interface between the member 162 and the exterior axial surface 154 of the neck 152.

The interior surface of the neck 152 is threaded at the extreme axial end thereof, as at 168, with the threads terminating in a radially enlarged groove 172 machined into the neck 152. A radially inwardly extending shoulder 174 is provided on the interior of the neck 152 for a purpose discussed herein. A central opening 175 extends axially from the shoulder 174 into the interior of the rotor 130.

Projecting radially outwardly in diametrically opposed directions from the main body portion of the rotor 130 are first and second vanes 182 and 184, respectively (FIG. 3). Each of the vanes is a substantially T-shaped member when viewed in transverse cross-section (FIG. 3) with the leg of the T extending radially outwardly from the axis 132 of the rotor 130. The edges of each of the cross arms of the T are each spaced a predetermined circumferential dimension from the radial surfaces of the leg of the T, the circumferential dimensions being indicated by dimension arrows 182R$_1$, and 182R$_2$ and 184R$_1$ and 184R$_2$ for the vanes 182 and 184, respectively. The axial ends of each of the T-shaped vanes are closed by wedge shaped end plates 182A and 182B (for the vane 182) and 184A and 184B (for the vane 184). The radially extending edges 182F$_1$ and 182F$_2$ (for the plate 182A of the vane 182) and 184F$_1$ and 184F$_2$ on each of the end plates are tapered (for the plate 184A for the vane 184) to conform to the edges 108F and 110F of the stators. The radially extending edges of the plates 182B and 184B (although not shown) are correspondingly tapered. The sides of the T (for each vane), together with the underside of each arm of the T and the axially inside surfaces of the plates cooperate to define hollowed-out regions on each side of each of the T-shaped vanes.

From the foregoing description taken in connection with FIG. 3, it may be appreciated that as the vanes 182 and 184 extend from the rotor 130 into the cavities 104 and 106, each cavity as respectively subdivided into first and second fluid volumes 104-I and 104-II and 106-I and 106-II. Of course, as the rotor 130 rotates with the shaft 30 the angular dimensions of the volumes I and II of each cavity 104 and 106 vary. However, due to the above-described construction of the vanes, the minimum angular dimension of any of the fluid volumes is equal to the angular dimension defined between an edge of a stator and the confronting radial edge of the leg of the T-shaped vane. The volumes I and II in each cavity may communicate with each other through a narrow clearance 188 defined between the top surface of each vane and the interior 102 of the housing 80. Clearances 189 are also defined between the inner edges of the surface of the rotor.

The stators and vanes are sized and arranged such that when the clapper 22 is in the closed position the face 108F$_1$ of the stator 108 and the edges 182F$_1$ of the end plates 182 are in a predetermined close angular proximity to each other. When the clapper 22 is closed, an angular clearance distance on the order of five degrees exists between the radial faces of the rotor and stator. This clearance defines a safety factor to accommodate misalignment when the dampener is attached to the valve shaft. Simultaneously, the face 110F$_2$ of the stator 110 and the edges 184F$_2$ of the end plates 184 are also in close angular proximity. As the clapper 22 is opened, the rotation of the shaft 30 and the rotor 130 displaces the vanes in the direction of arrow 192. With the clapper 22 fully open, the edges 182F$_2$ of the plates 182 are in close proximity to the face 110F$_1$ of the stator 110 and the face 108F$_2$ of the stator 108 is simultaneously in close proximity to the edges 184F$_1$ of the end plates 184. As the clapper is closed, the vanes rotate in the direction of the arrow 194.

The fluid volumes 104-I and 106-I communicate with each other through a radially extending passage 202 formed in the rotor 130. One radial end of the passage 202 is disposed in the rotor such that it opens in the side of the leg of the T-shaped vane 182 that lies next-circumferentially adjacent to the face 108F$_1$ of the stator 108, with the second radial end of the passage 202 being disposed in the rotor to open in the side of the leg of the T-shaped vane 184 that lies next-circumferentially adjacent to the face 110F$_2$ of the stator 110. Thus, the passage 202 may communicate with the volume I in each cavity even when those volumes occupy their minimum circumferential dimension (i.e., when clapper closed).

A second radial flow passage 206 is defined within the rotor 130, the second passage 206 being axially spaced and isolated from the first passage 202. Through the second passage 206 the fluid volumes 104-II and 106-II may communicate one with the other. One radial end of the flow passage 206 is disposed in the rotor such that the passage 206 opens at a point on the opposite side of the leg of the T-shaped vane 182 while the second end of the passage 206 is disposed in the rotor to open at a point on the other side of the T-shaped vane 184. The arrangement is best illustrated in FIG. 3. Thus, the second passage 206 is communicable with the volume II in each cavity even when those volumes occupy their minimum circumferential dimension (i.e., when the clapper is fully open). The first passage 202 communicates with the opening 175 provided in the rotor 130.

The central axial portion of the rotor 130 is provided with an opening 210 which is counterbored and threaded, as at 212, in the region axially intermediate the passages 202 and 206. Threaded onto the threads 212 is a hollow annular seating member 214. The flat annular surface of the member 214 defines a valve seat 214S. The central opening of the seating member 214 registers with the opening 210 to define an axially extending communication bore 216 between the passage 202 and the passage 206.

The passages 202 and 206, along with the communication bore 216, are part of a pressure relief arrangement which forms a constituent element of the dampener system in accordance with the instant invention. Also included as part of the pressure relief arrangement is a valve, generally indicated by reference character 220, which is biased to normally inhibit communication between the passages 202 and 206.

The valve arrangement 220 includes a valve piston 222 having an enlarged head 224 thereon. One surface 224 of the piston head abuts the seating surface 214S of the valve seat member 214. It is critically important that the inside surface area 224I of the portion of the head 224 that is exposed to the fluid in the second passage 206 (through the bore 216) equal the annular portion of the surface area 224E of the head exposed to the fluid in the first passage 202.

Extending from a collar 226 defined on the opposite surface of the valve head is a piston rod 228. The piston head 224 is reciprocally moveable with respect to a valve guide 230 in the direction of arrows 232, the direction of reciprocation being parallel to the axis 132 of the rotor 130. The guide member 230 includes a radially constricted axially extending member 234 which has a channel 235 therein. The guide member 230 is received within the opening 175 in the rotor. The guide channel 235 slideably receives the piston 222 therein. Sealed integrity along the interface between the piston 222 and the guide channel 235 is assured by an O-ring seal 236 provided in a groove 238 circumferentially disposed about the piston head. The guide member 230 includes an enlarged portion which flares radially outwardly to define a mounting flange 242. The mounting flange is received in abutment against the shoulder 174 provided on the interior surface of the neck 152 of the rotor 130. An O-ring seal 246 is disposed within a groove 248 circumferentially provided in the flange 242 seals the interface between the flange 242 and the interior of the neck 152.

The guide member 230 is secured in the described relationship within the central opening 175 of the rotor by a lock piece 250. The lock piece 250 is provided with a central bore 252 which registers with the bore 240 provided in the guide member 230. A radially extending shoulder 254 is disposed at the axial end of the surface of the bore 252. The lock piece 250 is externally threaded, as at 256, and is received within the threads 168 provided in the neck 152 of the rotor 130. An annular projection 258 is disposed circumferently about the exterior of the lock piece 250 axially past the threads 256.

The piston head 222 is biased into abutment with the annular seating surface 214S by a coil spring biasing element 262. The spring 262 is received within the annular recess defined between the exterior surface of the piston rod 228 and the registering internal surfaces 240 and 252 (on the guide member 230 and the lock piece 250, respectively). It may be useful to utilize a Belleville washer 263 as an adapter between the spring 262 and the piston 222. The spring 262 is axially confined between the adapter 263 on the collar 226 disposed on the rear of the piston head 222 and the shoulder 254 defined on the interior of the lock piece 250. It may be readily be appreciated that the magnitude of the biasing force acting in the direction of the arrow 264 on the piston head 222 may be changed by inserting a coil spring able to exert the desired biasing force. The axial end of the lock pieced 250 is covered by a cap 270 secured to the lock piece 250 by an array of bolts 272. A central vent member 274 is provided to insure that no pressure build-up occurs on the back side of the piston. That is, to insure that no pressure greater than atmospheric pressure is exerted on the backside of the piston. The vent 274 may be provided with a suitable cap to keep rain or dust from the dampener.

Figure 2:
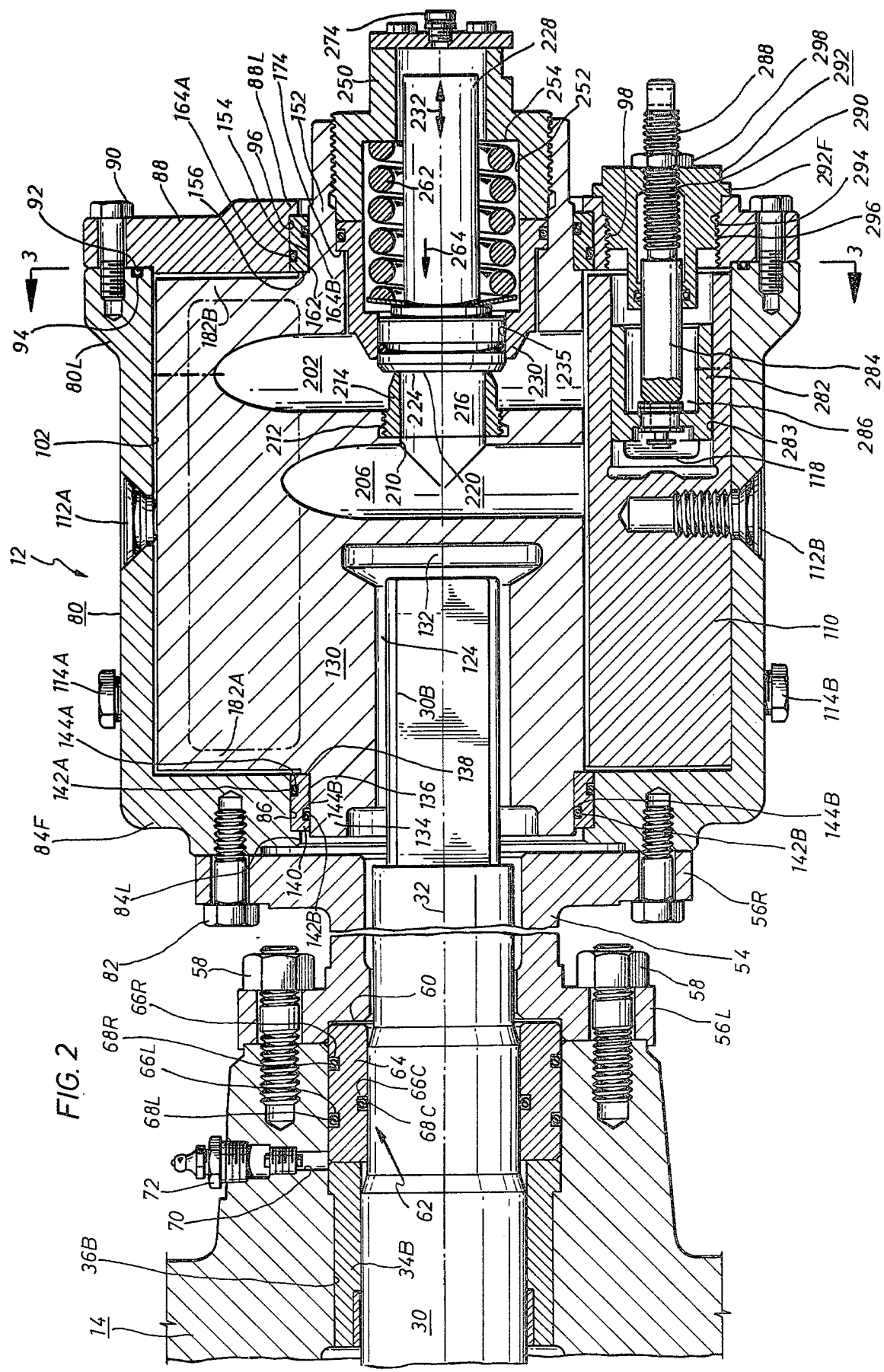
FIG. 2 is an enlarged side elevational view of a dampener arrangement in accordance with the instant invention.

As is noted earlier, stator 110 is provided with a transversely extending channel 118. The channel 118 provides a bypass route connecting the second volume 104-II disposed in the first cavity 104 with the first volume 106-I disposed in the second cavity 106 (FIG. 3). The degree of communication permitted between these last-mentioned fluid volumes is regulated by a hollow, cup-shaped piston 282 which is axially movable in a bore 283 defined in the stator and is able to seal the channel 118. The open end of the piston 282 is connected to the end of an axially extending piston rod 284 by an E-clip and flat washer arrangement 286 (FIG. 2). The piston rod 284 is threaded over approximately one-half its length with threads 288. The threads 288 engage with threads 290 provided along an opening formed in a second lock piece 292. A portion of the exterior surface the lock piece 292 is threaded, as at 294, and is received by corresponding threads 296 provided in the eccentric opening 98 in the cover 88. The second lock piece 292 is threadly secured within the eccentric opening 98 until a flange 292F engages against the top surface of the cover 88. The movement of the piston 282 is controlled from the exterior of the damper by manipulation of the piston rod 284 which slideably advances or retracts the piston to seal the bypass channel 118. The end of piston rod 284 is secured by a lock nut 298.

Having set forth the structure of the invention, the operation thereof may now be more readily explained.

Assuming that the clapper 22 is initially in the closed position when an actuating force is applied to the shaft 30. Responsive to the actuating force the vanes 182 and 184 of the rotor 130 displace within the cavities 104 and 106 in the direction of the arrows 192. Depending upon the degree of communication between the volumes 104-II and 106-I permitted through the bypass channel 118, the movement of the vanes in the direction 192 tends to pressurize the fluid in the volumes 104-II and 106-II, these volumes being next-forward in the direction of rotation (the arrow 192) of the vanes 182 and 184. The pressure increase in these volumes would tend to inhibit the motion of the vanes, and, thereby damp the movement of the clapper 22. If the opening speed of the clapper 22 is slow enough, leakage from the volume being pressurized (i.e., the volumes 104-II and 106-II) to the other volume in that cavity (104-I and 106-I, respectively) through the clearances 188 disposed between the vanes 182 and 184 and the interior 102 of the housing 80 and the clearances 189 between the stators and the rotor will tend to equalize pressures.

However, if the pressurization of the fluid in the volumes 104-II and 106-II is too rapid, the pressure increase is relieved through the pressure relief arrangement. The increase of pressure in the passage 206 is felt on the circular surface 224I of the piston face 224 which is exposed to the fluid in the passage 206 through the channel 216. The force of the fluid acts in opposition to the force of the bias spring to open the valve 220 and relieve the pressure in the second volumes 104-II and 106-II by venting the fluid to the first volumes 104-I and 106-I.

Of course, when the clapper is moved to the closed position in the direction of the arrow 194 any rapid pressure increase in the volumes 104-I and 106-I is accommodated by the venting of the passage 202 to the passage 206 by the force of the fluid acting over the annular portion 224E of the head outside the perimeter of the valve seat 214S. The fluid pressure in the first volumes 104-I and 106-I and in the passage 202 is vented into the passage 206, thus relieving the pressure into the second volumes 104-II and 106-II. The magnitude of the pressure at which the valve 224 is opened (to vent either the first or the second conjoined volumes) remains constant for a given biasing spring. Opening the bypass piston 282 does not alter this pressure, but requires that the rotor must rotate at a greater speed to reach the relief pressure. Opening the bypass piston 282 has been shown to lessen the resistance to rotation. If the piston 282 is fully open, so that the channel 118 is not obstructed, fluid freely passes from the volumes and the rotor can be turned with little resistance.

Having described the preferred embodiment of the invention, those skilled in the art having benefit of these teachings may effect numerous modifications thereto. These modifications are to be construed as lying within the scope of this invention, as defined in the appended claims.

What is claimed is:

1. In a valve having a clapper mounted on a valve shaft for opening and closing movement out of and into a flow path defined between an inlet and an outlet port provided in a valve casing, wherein the improvement comprises a dampener arrangement for damping both the opening and closing movement of the clapper, the dampener arrangement comprising:

a fluid-tight housing having a first and a second radially inwardly directed stator member cooperating to subdivide the cavity into a first and a second cavity, each cavity being adapted to receive a damping fluid therein;

a rotor connectable to the valve shaft for movement therewith, the rotor having a first and a second vane extending therefrom, each vane subdividing one of the cavities into a first and a second fluid volume, each vane being displaceable within the cavity in which it is disposed in a first and a second direction in accordance with the opening and closing movement of the clapper, the movement of the clapper being adapted to be retarded by movement of each vane through damping fluid in each cavity increasing the pressure of damping fluid disposed in the fluid volume forward of each vane in the direction of movement thereof; and a pressure relief arrangement disposed within the rotor to relieve pressure generated in the fluid in the volumes forward of the vanes in the direction of movement thereof when the fluid pressure exceeds a predetermined pressure, the pressure relief arrangement comprising a first passage disposed in the rotor in fluid communication with each of the first fluid volumes in each cavity to balance the pressures in the two first fluid volumes; a second passage disposed in the rotor in fluid communication with each of the second fluid volumes in each cavity to balance the pressures in the two second fluid volumes; a bore placing; the first and second passages in communication with each other and a relief valve disposed between the first and second passages to cooperate with the bore, the relief valve being biased to a normally closed position, and the relief valve being responsive to a force imposed thereon when the pressure of fluid in one of the passages exceeds the predetermined pressure to open the valve and to communicate the first passage with second passage through the bore.

2. Apparatus according to claim 1 wherein the bore is closed by the relief valve such that equal portions of the surface area of the relief valve are exposed to the first and the second passages.

3. Apparatus according to claims 1 or 2 further comprising a bypass channel disposed between a volume in one of the volumes in the first cavity and the other volume in second cavity.

4. Apparatus according to claim 3 further comprising means for varying the cross sectional area of the bypass channel.

5. Apparatus according to claim 2 wherein the relief valve is biased to the seated position by a coil spring biasing element.

6. Apparatus according to claim 3 wherein the relief valve is biased to the seated position by a coil spring biasing element.

7. Apparatus according to claims 1 or 2 wherein each vane is a member that presents a substantially T-shaped cross-section when viewed from the end thereof.

8. Apparatus according to claim 7 wherein each vane further comprises a first and a second wedge-shaped plate disposed at each axial end thereof, a portion of the axially inside surfaces of each of the plates cooperating with one side of the leg of the T-shaped vane to which it is attached and an undersurface of each arm of the T to define a hollowed-out region on each side of an axis extending through each vane, the first passage communicating with the other hollowed-out region of each vane.

9. Apparatus according to claim 4 wherein the by-pass channel is disposed through one of the stators and communicates one of the volumes in one cavity with the other of the volumes in the second cavity, and wherein the means for varying the cross-sectional area of the by-pass channel comprises a piston axially movable in a bore defined in the stator.

10. A dampener arrangement for a check valve having a casing defining a flow path through the check valve and having a valve element mounted on a valve shaft for opening and closing movement relatively to the flow path, the dampener arrangement comprising:
(a) a fluid tight housing for mounting relatively to such a check valve casing, the housing defining first and second cavities therein for receiving a damping fluid;
(b) a rotor positioned in the housing for connection to such a valve shaft for movement therewith, the rotor having first and second vanes which extend therefrom into the first and second cavities respectively for each vane to subdivide one of the cavities into first and second fluid volumes, each vane being displaceable within the cavity in which it is disposed through damping fluid in the cavity in first and second directions in accordance with opening and closing movements of such a valve shaft when the rotor is connected thereto, the movement of the rotor being adapted to be retarded by movement of the vanes through damping fluid in the cavities increasing the pressure of damping fluid disposed in the two fluid volumes forward the two vanes in the direction of movement thereof; and
(c) a pressure relief arrangement disposed within the rotor, the pressure relief arrangement comprising a first passage disposed in the rotor in fluid communication with the two first fluid volumes of the two cavities to balance the pressures in the two first fluid volumes, a second passage disposed in the rotor in fluid communication with the two second fluid volumes of the two cavities to balance the pressures in the two second fluid volumes, a bore placing, the first and second passages in communication with each other and a relief valve disposed between the first and second passages to cooperate with the bore, the valve being biased to a normally closed position, and the relief valve being responsive to a force imposed thereon when fluid pressure is one of the passages generated by the vanes compressing fluid in the two volumes forward of the vanes in their direction of movement exceeds a predetermined pressure to open the relief valve and place the first and second passages in communication with each other through the bore.

11. A dampener arrangement according to claim 10, in which the first and second cavities of the housing are defined by first and second radially inwardly directed stator members.

12. A dampener arrangement according to claim 10, including a check vavle on which the dampener arrangement is mounted with the rotor of the dampener arrangement connected to a valve shaft of the check valve.

* * * * *